(12) United States Patent
Kado

(10) Patent No.: US 10,715,689 B2
(45) Date of Patent: Jul. 14, 2020

(54) IMAGE PROCESSING APPARATUS, METHOD FOR CONTROLLING IMAGE PROCESSING APPARATUS, AND RECORDING MEDIUM

(71) Applicant: CANON KABUSHIKI KAISHA, Tokyo (JP)

(72) Inventor: Kazuki Kado, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/366,921

(22) Filed: Mar. 27, 2019

(65) Prior Publication Data

US 2019/0306343 A1 Oct. 3, 2019

(30) Foreign Application Priority Data

Apr. 2, 2018 (JP) ................................. 2018-070625

(51) Int. Cl.
*H04N 1/00* (2006.01)
(52) U.S. Cl.
CPC ..... *H04N 1/00413* (2013.01); *H04N 1/00209* (2013.01); *H04N 2201/0094* (2013.01)
(58) Field of Classification Search
CPC ........................ H04N 1/00413; H04N 1/00209
See application file for complete search history.

(56) References Cited

U.S. PATENT DOCUMENTS

| 10,205,846 | B1* | 2/2019 | Bermundo | ......... H04N 1/32106 |
|---|---|---|---|---|
| 2002/0126322 | A1* | 9/2002 | Kadowaki | ............ H04N 1/0035 358/440 |
| 2005/0111015 | A1* | 5/2005 | Tsujimoto | ............ G06K 15/005 358/1.9 |
| 2008/0141167 | A1* | 6/2008 | Kubo | .................... G06F 3/0482 715/796 |
| 2015/0222770 | A1* | 8/2015 | Yoshida | ............. H04N 1/00517 358/1.15 |

FOREIGN PATENT DOCUMENTS

JP 2010-201931 A 9/2010

* cited by examiner

*Primary Examiner* — Ibrahim Siddo
(74) *Attorney, Agent, or Firm* — Canon U.S.A., Inc. IP Division

(57) ABSTRACT

Image processing apparatuses have a unit for registering settings in applications or a unit for registering application settings on a portal screen, but do not allow these units to function in a coordinated manner. For example, if a user who frequently uses a certain application registers settings of the application, the settings may also be useful to other users. However, users who mainly use their own portal screens cannot invoke the settings. Settings of an application registered as a shared custom button are automatically registered as frequently used settings in the application. Similarly, settings registered as frequently used settings in an application are automatically registered as a shared custom button.

19 Claims, 14 Drawing Sheets

FIG. 9

| TYPE | SETTING VALUE | | | | | | |
|---|---|---|---|---|---|---|---|
| | NUMBER OF COPIES | SELECTION OF COLOR OR NOT | SELECTION OF PAPER | AGGREGATED PAGES | DOUBLE SIDED COPY | DOUBLE SPREAD→2 PAGES | MAGNIFICATION RATIO | etc... |
| DEFAULT SETTING | ONE COPY | ACHROMATIC | AUTOMATIC | 1 in 1 | SINGLE SIDED COPY | OFF | 100% | ... |
| PERSENT SETTING | TWO COPIES | COLOR | AUTOMATIC | 1 in 1 | DOUBLE SIDED COPY | OFF | 100% | ... |

| BUTTON ID (1201) | APPLICATION ID (1202) | SHARED / MY (1203) | BUTTON NAME (1204) | COMMENT (1205) | DATA (1206) |
|---|---|---|---|---|---|
| 1001 | 101 | SHARED | CONTRACT | SETTING BASED ON CONTRACT | data1.xml |
|  |  |  |  |  |  |
|  |  |  |  |  |  |
|  |  |  |  |  |  |
|  |  |  |  |  |  |
|  |  |  |  |  |  |
|  |  |  |  |  |  |

FIG. 12B

| BUTTON ID (1201) | BUTTON NAME (1204) | COMMENT (1205) | DATA (1206) |
|---|---|---|---|
| 1001 | CONTRACT | SETTING BASED ON CONTRACT | data1.xml |
|  |  |  |  |
|  |  |  |  |
|  |  |  |  |
|  |  |  |  |
|  |  |  |  |
|  |  |  |  |

IMAGE PROCESSING APPARATUS, METHOD FOR CONTROLLING IMAGE PROCESSING APPARATUS, AND RECORDING MEDIUM

BACKGROUND OF THE INVENTION

Field of the Invention

The aspect of the embodiments relates to an image processing apparatus, and in particular to an image processing apparatus capable of executing a job using a frequently used setting.

Description of the Related Art

Some conventional image processing apparatuses have a function that allows settings used in executing a job to be stored as a history, so that the stored settings can be invoked again and reused in executing a new job.

Some image forming apparatuses have a function that allows settings registered in an application to be used via a shortcut on a portal screen.

Japanese Patent Application Laid-Open No. 2010-201931 discloses an image forming apparatus that stores multiple setting histories of executed jobs and, among the stored setting histories, displays setting histories corresponding to an authenticated operator.

SUMMARY OF THE INVENTION

The aspect of the embodiments provides an apparatus including: an executing unit for executing multiple applications; a registration unit that registers settings of the applications; and a display unit that displays a screen managed for each user. The display unit displays, on the screen, a first selecting unit for selecting a first setting of an application registered as a setting shared among users.

Further features of the disclosure will become apparent from the following description of exemplary embodiments with reference to the attached drawings.

BRIEF DESCRIPTION OF THE DRAWINGS

FIG. 9 illustrates an exemplary data table saved in a memory area for a copying function.

FIG. 12A illustrates an exemplary data table of custom buttons and frequently used settings of applications.

FIG. 12B illustrates an exemplary data table of custom buttons and frequently used settings of an application.

DESCRIPTION OF THE EMBODIMENTS

Embodiments of the disclosure will now be described in detail in accordance with the accompanying drawings.

The following embodiment is not intended to limit the disclosure. Not all of features described in the embodiment are necessarily required for solutions of the disclosure.

Figure 1:
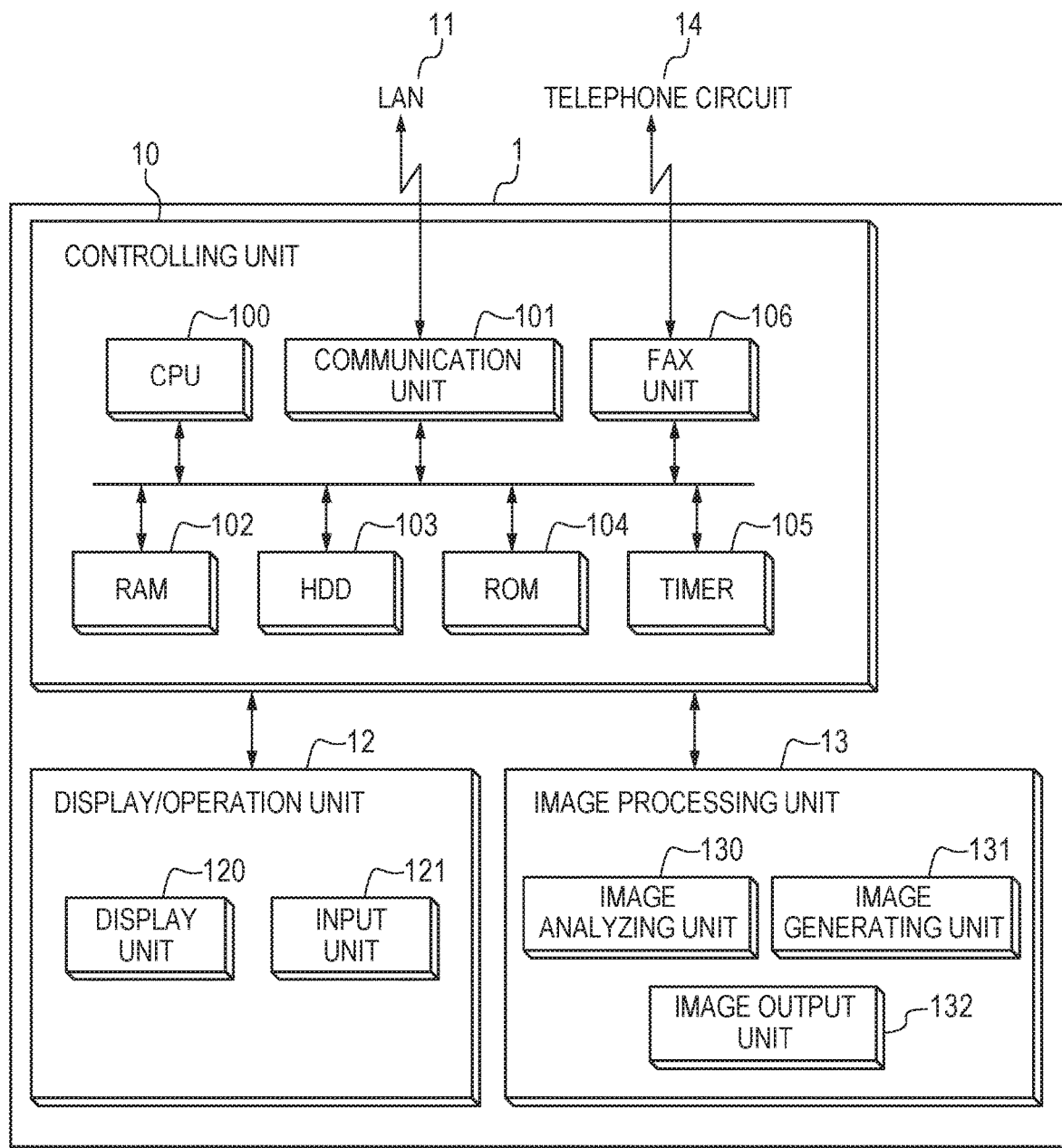
FIG. 1 is a block diagram illustrating a configuration of an image processing apparatus.

FIG. 1 is a block diagram illustrating a configuration of an image processing apparatus according to an embodiment of the disclosure.

The image processing apparatus 1 includes a controlling unit 10, a display/operation unit 12, and an image processing unit 13.

An example of the image processing apparatus 1 is a multifunction machine (MFP: MultiFunction Peripheral), which has functions of executing multiple applications such as a copying application, a fax application, and a scanning and transmitting application.

The controlling unit 10 controls operation of each unit in the image processing apparatus 1.

The controlling unit 10 includes a CPU 100, a RAM 102, an HDD 103, a ROM 104, a communication unit 101, a timer 105, and a fax unit 106. The controlling unit 10 is connected to the Internet via a LAN 11.

The CPU 100 controls the entire controlling unit 10.

The LAN 11 is a network for exchanging data with external apparatuses.

The communication unit 101 transmits and receives data via the LAN 11.

The RAM 102 provides system work memory for the CPU 100 to operate.

The HDD 103 is a hard disk drive and can store data such as text data and setting data.

The hard disk drive may be replaced with a storage medium such as a magnetic disk, an optical medium or flash memory.

The HDD 103 may not reside in the image processing apparatus. In that case, an external apparatus such as a server or PC may be utilized as a storage device via the communication unit 101.

The ROM 104 is a boot ROM and stores a boot program of the system.

Through the ROM 104, which is the boot ROM, the CPU 100 loads programs installed in the HDD 103 into the RAM 102. The CPU 100 performs various sorts of control based on the loaded programs.

The timer 105 measures time according to an instruction from the CPU 100 and, after a lapse of a specified period, notifies the CPU 100 such as by interruption.

The fax unit 106 transmits and receives fax data via a telephone line 14.

The display/operation unit 12 is controlled by the controlling unit 10 and includes a display unit 120 and an input unit 121.

The display unit 120 is a display for displaying information generated by the image processing apparatus to a user.

The input unit 121 includes, for example, devices such as a touch panel, mouse, camera, voice input device and keyboard, and receives input from the user via an interface.

The image processing unit 13 is controlled by the controlling unit 10 and includes an image analyzing unit 130, an image generating unit 131 and an image output unit 132.

The image analyzing unit 130 analyzes an image on a document and extracts information from the result of the analysis.

The image generating unit 131 generates image data by, for example, scanning and reading a document and digitizing an image on the document, and stores the generated image data in the HDD 103. The image generating unit 131 can also generate image data in another format using information resulting from analysis of the image analyzing unit 130.

The image output unit 132 outputs image data stored in a location such as the HDD 103. The image data may be output in such a manner that the image data is printed on paper, transmitted to a network-connected external device or server via the communication unit 101, or saved in a storage medium connected to the image processing apparatus.

Figure 2:
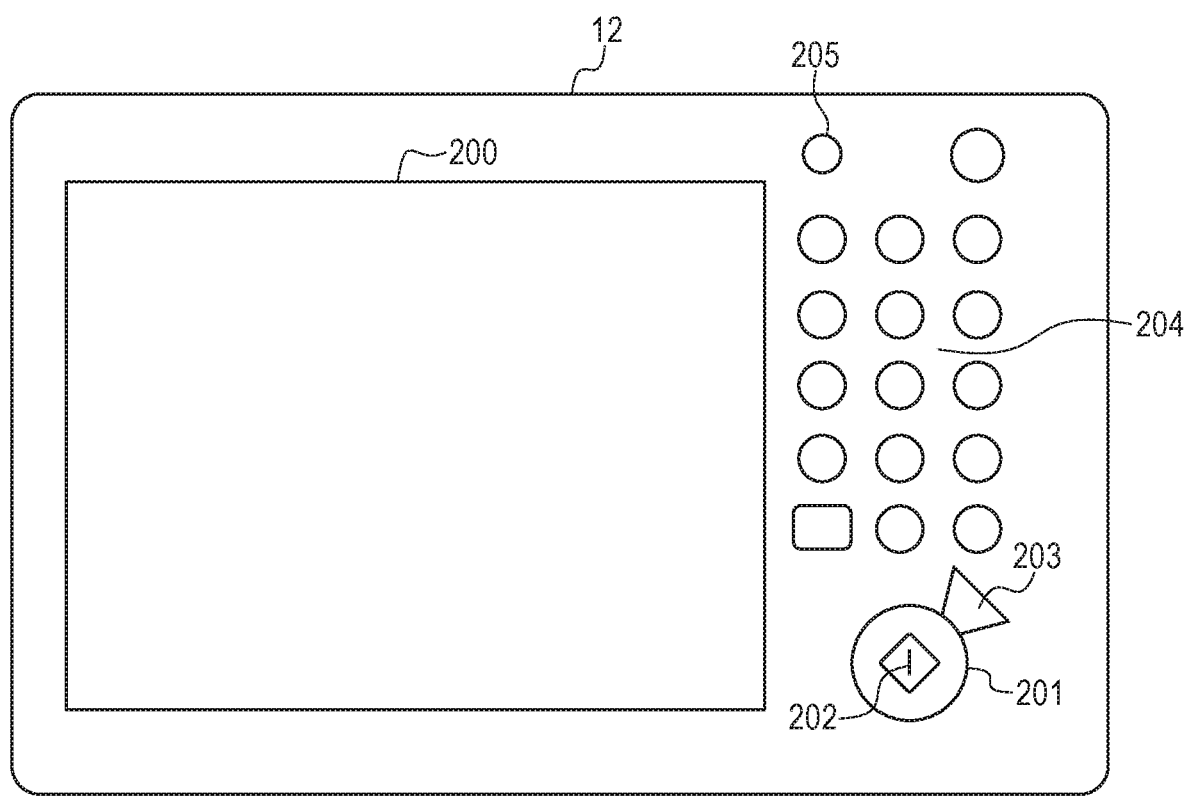
FIG. 2 is a schematic diagram of a display/operation unit.

FIG. 2 is a schematic diagram of the display/operation unit 12 according to this embodiment.

A touch panel 200 here is a liquid crystal display unit. A touch panel sheet adheres to the liquid crystal panel, on which an operation screen and soft keys are displayed. When a displayed key is pressed, information about the pressed location is provided to the CPU 100. Therefore, the touch panel 200 here functions as both the display unit 120 and the input unit 121 in FIG. 1.

Now, various keys and buttons on the display/operation unit 12 operated by the user will be described.

A start key 201 is used to provide an instruction such as to start document reading operations. At the center of the start key 201 are LEDs 202 of two colors: green and red. Whether the start key 201 is operable is indicated by its color.

A stop key 203 serves to stop a currently active operation.

A numeric keypad 204 includes alphanumeric buttons, which are used to provide instructions such as to set the number of copies and switch among screens of the touch panel 200.

A user mode key 205 is pressed for configuring the apparatus.

Hereinafter, to "display a screen" means that the CPU 100 invokes corresponding screen display data and a screen control program from the HDD 103 or the RAM 102 and displays the screen display data on the display unit 120.

Also hereinafter, an operation on the touch panel or a certain key may be referred to like "the user presses . . . ." This means that the user presses a button, list or key displayed on the screen to cause the CPU 100 to perform appropriate processing based on the screen control program and according to location information provided by the input unit 121 and to the screen control data.

Figure 3:
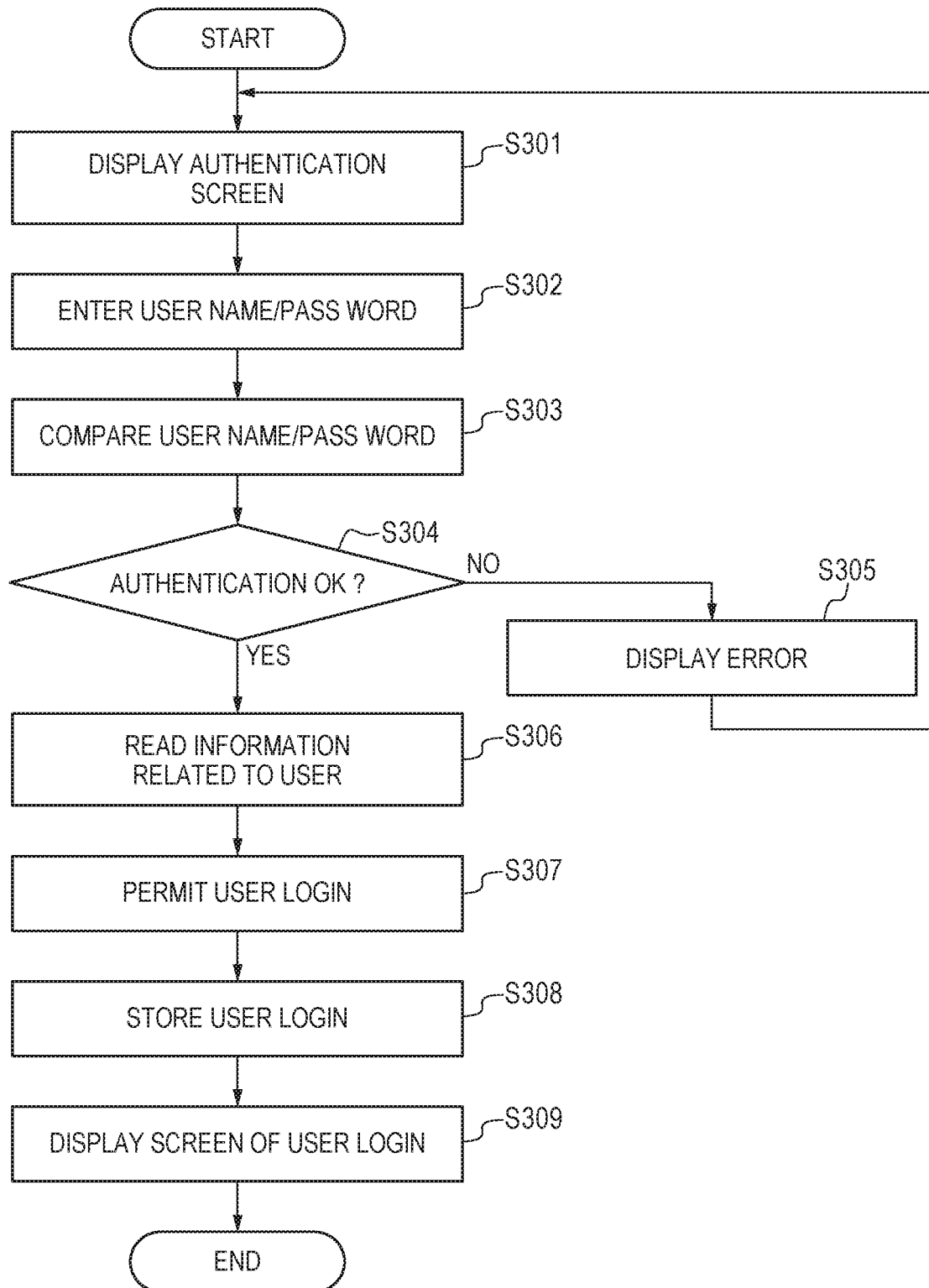
FIG. 3 is a flowchart of the process from starting up the image processing apparatus to displaying a login user's screen.

FIG. 3 is a flowchart of the process from starting up the image processing apparatus to displaying a login user's screen, according to this embodiment.

If a user identification function is enabled, the CPU 100 displays a user authentication screen on the touch panel 200 (S301) after start-up of the image processing apparatus.

Figure 4:
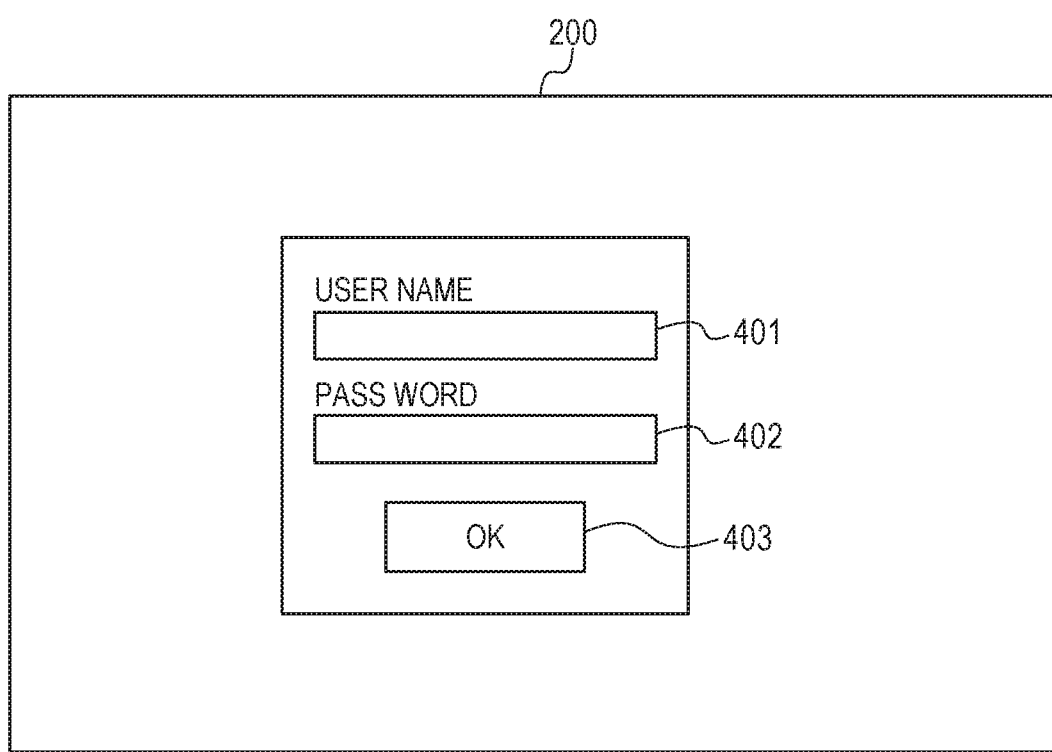
FIG. 4 illustrates an authentication screen displayed on the display/operation unit.

FIG. 4 illustrates an authentication screen that may be displayed. The authentication screen has fields in which the user is to enter a user name 401 and a password 402.

After the authentication screen is displayed, the image processing apparatus waits for the user name and password to be entered (S302).

The user then enters the user name and password and presses an OK button 403. The CPU 100 compares the input user name and password with user names and passwords registered in the HDD 103 to see whether there is a match (S303).

If none of the pairs of registered user names and passwords matches the entered user name and password, the CPU 100 determines that the authentication fails. The CPU 100 displays an error message on the touch panel 200 and displays the authentication screen again (S304, S305).

If any of the pairs of registered user names and passwords matches the entered user name and password, the CPU 100 determines that the authentication succeeds. The CPU 100 invokes user-related information registered in the HDD 103 (S304, S306).

After the information is invoked, the CPU 100 permits the user to log in (S307).

The CPU 100 stores the current login user in the HDD 103 (S308).

The CPU 100 then displays, on the touch panel 200, a home screen that reflects settings registered by the login user (S309).

Figure 5:
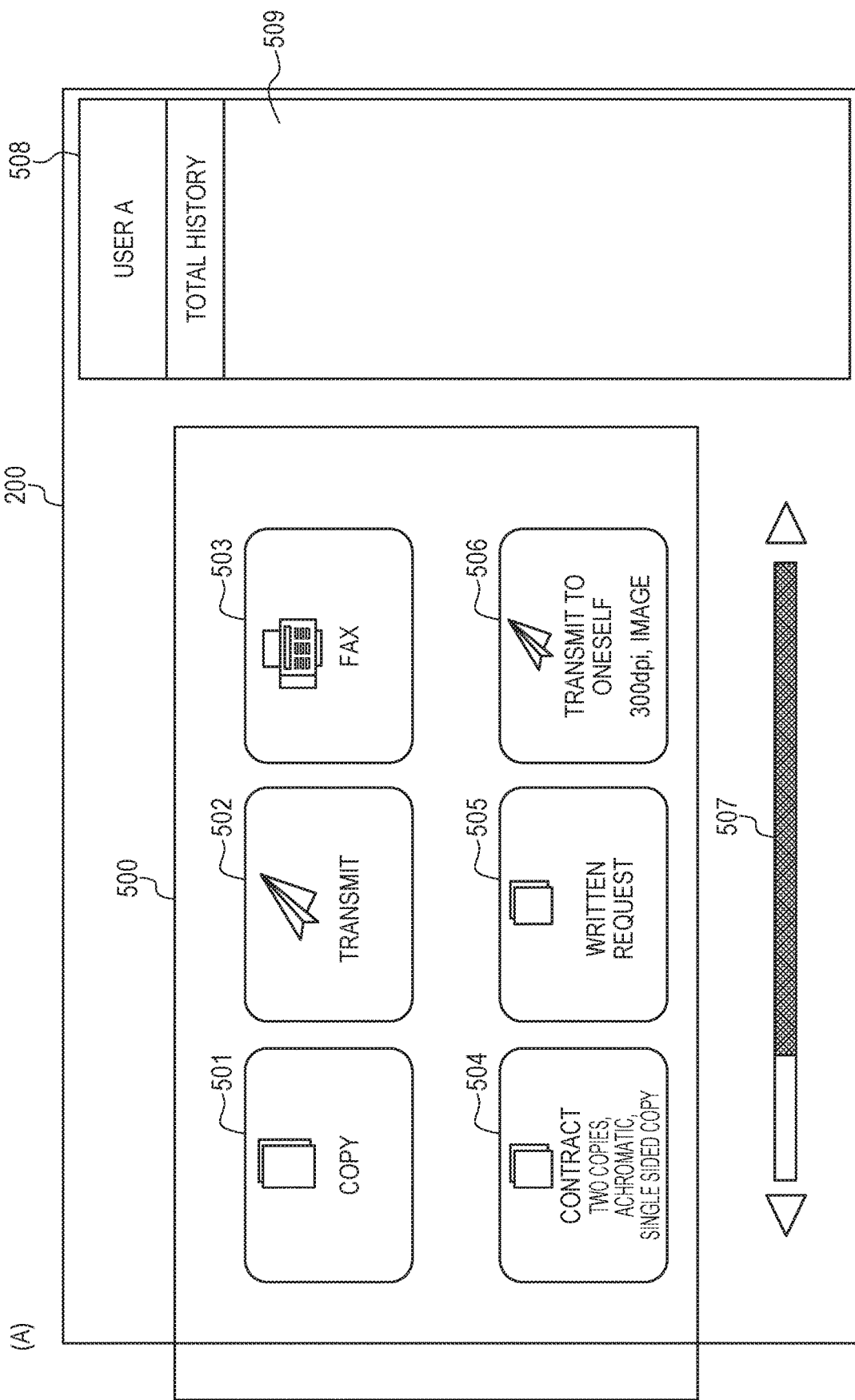
FIG. 5 illustrates exemplary display of a home screen.

FIG. 5 illustrates a home screen 200 that reflects settings registered by the login user.

A menu 500 for starting applications is displayed on the login user's home screen 200.

The menu 500 includes application buttons 501 to 503 for starting applications with default settings, and custom buttons 504 to 506 for starting applications with registered settings in advance.

These buttons 501 to 506 are displayed based on registered information related to the login user in a layout customized to the login user.

The custom buttons 504 to 506 include my-buttons displayed only on the login user's home screen, and shared buttons displayed on other users' home screens as well, according to settings.

The user can select these buttons 501 to 506 to execute jobs corresponding to the buttons.

A slider bar 507 indicates that the menu 500 can be slidably displayed. In response to the user sliding the slider bar 507, pressing an arrow at either end, or flicking on the menu 500, the CPU 100 invokes application buttons and custom buttons residing in an adjacent area from the HDD 103 and displays the buttons.

The name of the current login user is displayed in a user name display area 508 at the upper right. The example shown in FIG. 5 indicates that the "user A" is currently logging in.

A total history 509 is an area in which histories of settings made for jobs of applications executed on the image processing apparatus are automatically registered and displayed.

The area of the total history 509 displays only histories of settings of jobs executed by the login user. If the login user has never executed jobs or has deleted histories in the total history 509, the area of the total history 509 is empty as shown in FIG. 5.

Operations related to display in the total history 509 is performed by the CPU 100 using a program stored in the HDD 103. Data used in the operations for the total history is saved in the RAM 102 or the HDD 103.

Figure 6:
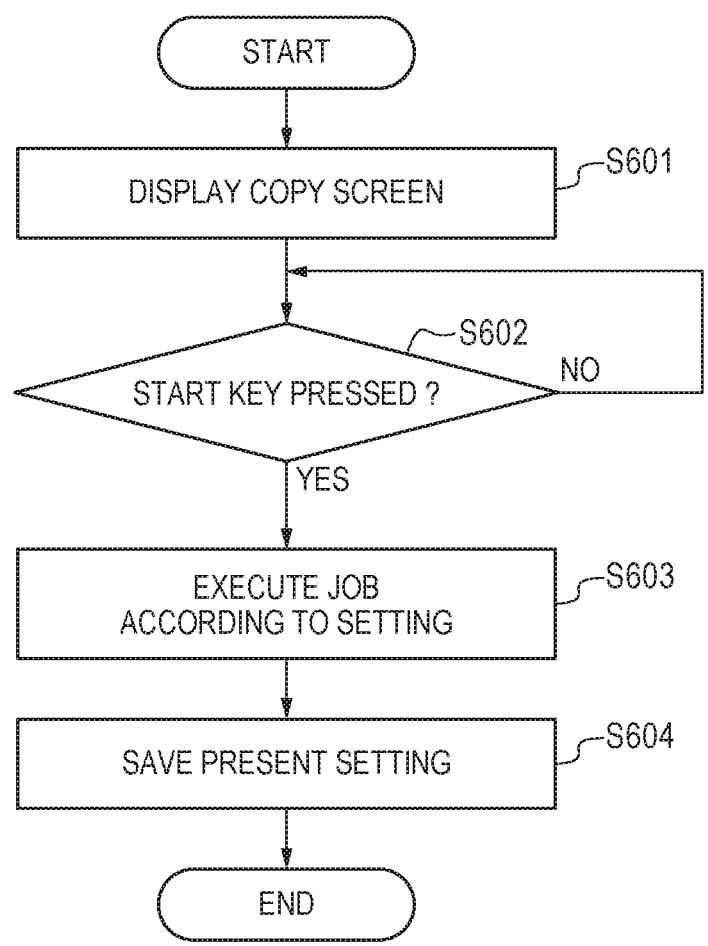
FIG. 6 is a flowchart of the process from starting an application to executing a job.

FIG. 6 is an exemplary flowchart of the process from starting an application to executing a job.

Figure 7A:
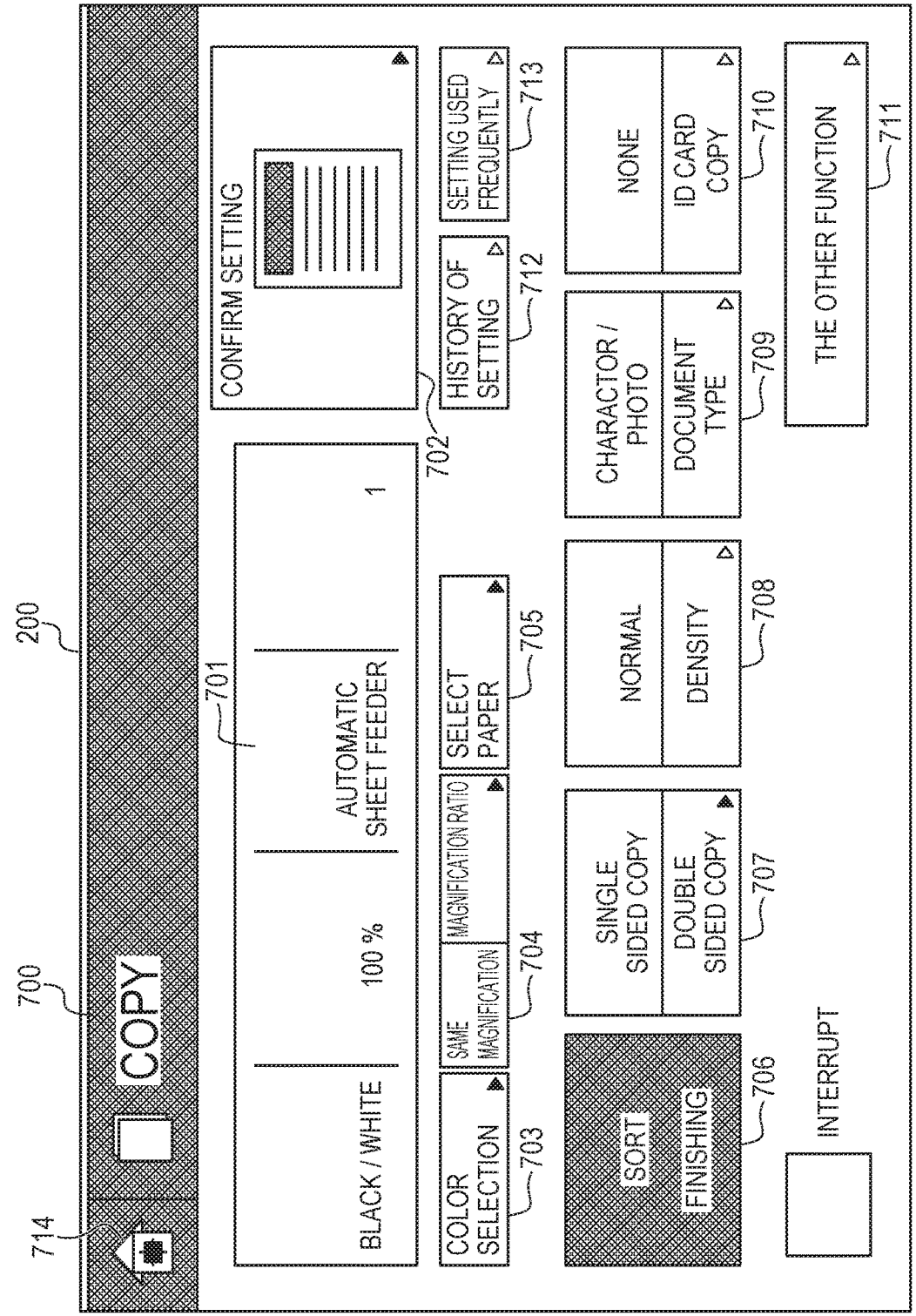
FIG. 7A illustrates exemplary display of a copy screen.
Figure 7B:
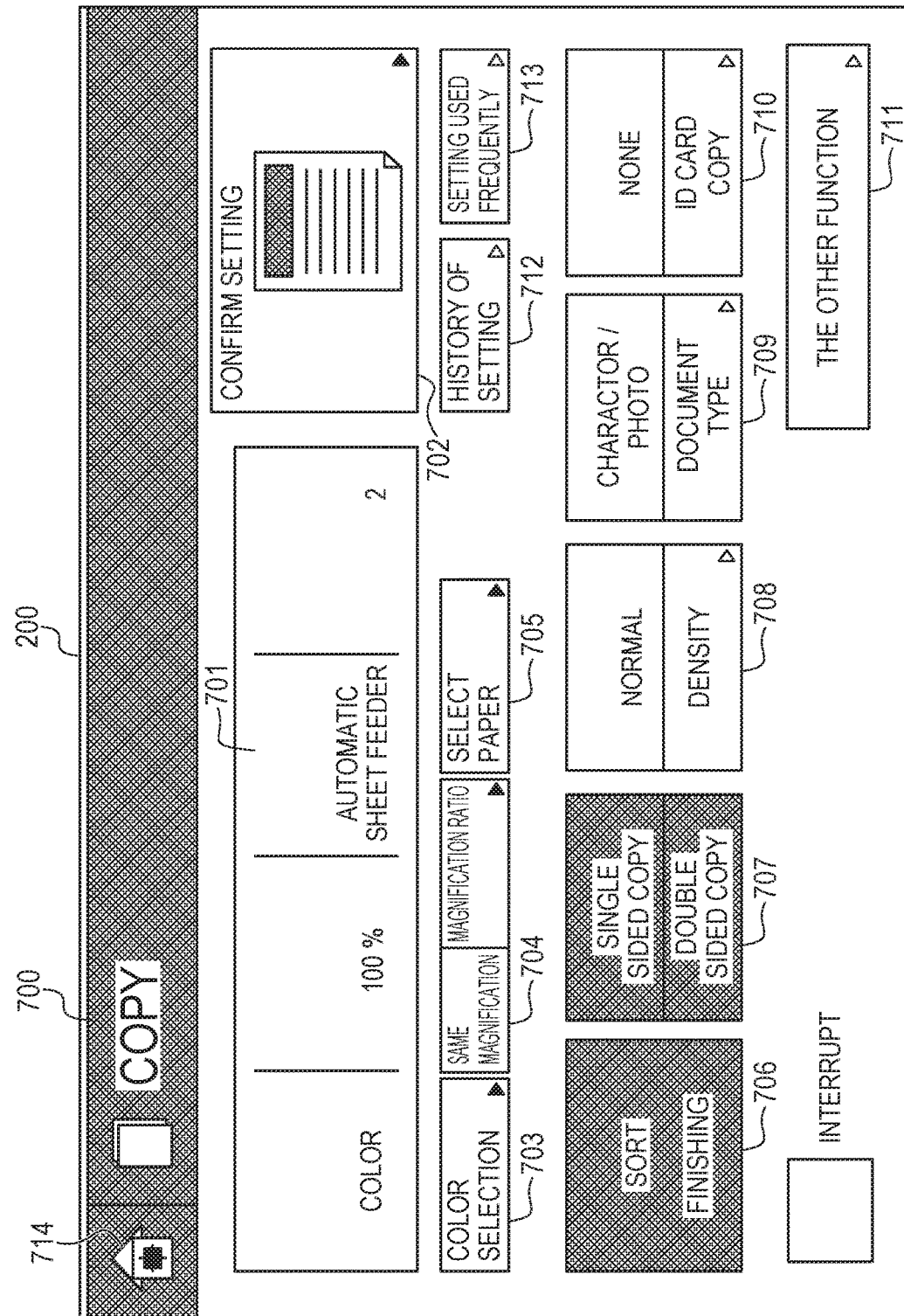
FIG. 7B illustrates exemplary display of the copy screen.

It is assumed that the user selects COPY as an application in the menu 500. In response to the selection of COPY, the CPU 100 invokes a copying application from the HDD 103 and displays a copy screen 700 as illustrated in FIGS. 7A and 7B on the touch panel 200 (S601). If the user selects some other application, the CPU 100 displays a corresponding application screen on the touch panel 200.

Subsequent operations and display for the application are performed by the CPU 100 using the application program stored in the HDD 103. Data used by the application is stored in the RAM 102 or the HDD 103 in relation to the application.

The copy screen 700 includes an area 701 displaying set values of color, magnification ratio, paper size and quantity, and buttons 702 to 713 used for making settings and the like.

A button 702 shows a preview image with the current settings. Pressing the button 702 causes a screen of current detailed settings to be displayed. Other buttons for making settings of basic copying functions include a SELECT COLOR button 703, a MAGNIFICATION RATIO setting button 704, a SELECT PAPER button 705, a FINISHING button 706, a DOUBLE-SIDED button 707, a DENSITY button 708, a DOCUMENT TYPE button 709 and a COPY ID-CARD button 710.

Other copying functions are accessed on a screen displayed by pressing an OTHER FUNCTIONS button 711.

A SETTING HISTORY button 712 is a button for displaying histories of copy settings used in the past.

A FREQUENTLY USED SETTINGS button 713 is a button for displaying a screen 800 on which frequently used settings are registered, edited and invoked.

A home button 714 is a button for returning to the home screen.

From the set values displayed in the area 701 and from the inverted FINISHING button 706, it can be seen that the settings displayed in FIG. 7A specify black/white, a magnification ratio of 100%, the auto paper size, one copy, and sorting. Then, in response to the user placing a document to be copied on a scanner and pressing the start key 201, the CPU 100 provides an instruction to perform copying with these settings to the image processing unit.

As another example, settings displayed in FIG. 7B specify two copies, color, double-sided, etc. Then, in response to the user placing a document to be copied on the scanner and pressing the start key 201, the CPU 100 provides an instruction to perform copying with these settings to the image processing unit 13.

Thus, the CPU 100 waits for the user to press the start key 201 (S602).

When the start key 201 is pressed, the CPU 100 causes the image processing unit 13 to read the document with the scanner. Upon completion of the reading, the image processing unit 13 generates an output image. Here, the image processing unit 13 outputs a printed copy of the input document so that the copy reflects the settings specified for the copying application (S603).

The CPU 100 executes the job while saving the copy settings used for this job in a memory area for the copying application in the HDD 103 (S604).

FIG. 9 illustrates a data table saved in the memory area for the copying application in the HDD 103.

As shown by headers 901 of the data table in FIG. 9, the data table records application settings. Default settings 902 in the first row saves default set values of the copying application. Additionally, present settings 903 in the second row saves settings used for the job executed this time.

Now, the function of frequently used settings of an application will be described with reference to FIGS. 8A and 8B.

Figure 8A:
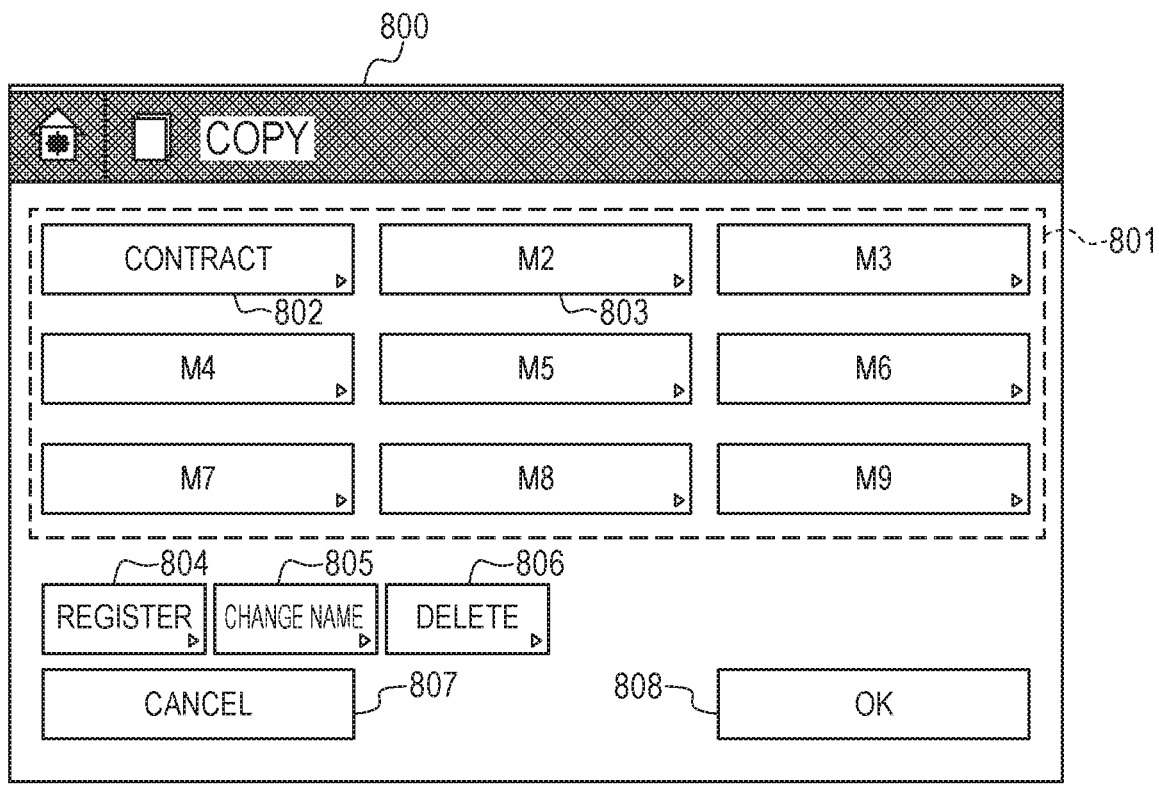
FIG. 8A illustrates exemplary display of frequently used settings for copying.

The screen 800 in FIG. 8A, which is invoked with the FREQUENTLY USED SETTINGS button 713 in FIGS. 7A and 7B, is a screen for registering, editing and invoking frequently used settings of the copying application.

Selecting one in a group of frequently used setting buttons 801 and pressing an OK button 808 enables invoking settings registered with the selected button. Pressing a DELETE button 806 enables deleting the registered settings.

Pressing a REGISTER button 804 enables registering, as new frequently used settings, application settings being specified when the screen 800 is opened.

Registered settings are saved in the same data structure as the data table shown in FIG. 9.

Figure 8B:
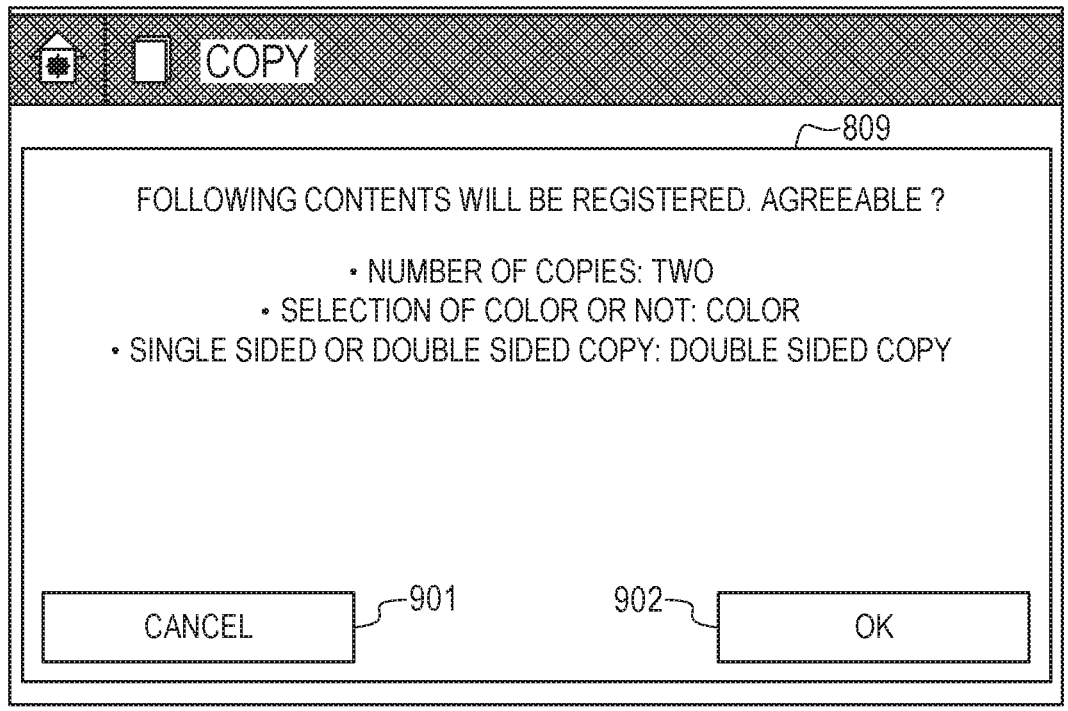
FIG. 8B illustrates exemplary display of frequently used settings for copying.

For settings modified from the default settings, a popup 809 is displayed at the time of registration, as shown in FIG. 8B. After registration, a CHANGE NAME button 805 may be pressed to change the name of the button.

Pressing a CANCEL button 807 enables closing the frequently used settings screen 800 and returning to the copy screen 700. The frequently used settings buttons 803 labeled M2 to M9 indicate that settings are not yet assigned to these buttons.

Now, a method of registering a custom button will be described.

When the user selects a certain combination of settings to execute a job while using an application, the combination of settings used for the executed job is displayed as a history in the total history 509 section. Here, a combination of settings for a job displayed in the total history 509 section may be selected to be displayed as a new custom button on the home screen 200.

The new custom button may be automatically displayed in an unoccupied area in the menu 500 on the home screen 200, or the user may be allowed to select where to place the button on the home screen 200.

A flow from registering a custom button to registering frequently used settings of an application will be described with reference to FIG. 10.

Upon detecting that a custom button is registered, the CPU 100 first determines whether or not the custom button is to be shared (S1001).

If the registered custom button is not to be shared, the custom button is not registered as frequently used settings of an application, and the process terminates. This is because only shared custom buttons that can be exposed to any user are registered as frequently used settings of applications.

If the registered custom button is to be shared, the CPU 100 determines whether the job executed with the custom button was executed in an application that supports frequently used settings (S1002).

Here, the CPU 100 uses an application ID to query a data table of the executed application for information (to be described below with reference to FIGS. 12A and 12B).

If the job executed with the custom button was executed in an application that does not support frequently used settings, the settings cannot be registered as frequently used settings of the application, and therefore the process terminates.

If the job executed with the custom button was executed in an application that supports frequently used settings, it is determined whether the settings are already registered as frequently used settings of the application (S1003).

Again, the CPU 100 uses the application ID to query the executed application for information.

If the settings of the registered custom button are already registered as frequently used settings of the application, no further registration is needed and therefore the process terminates.

If the settings of the registered custom button are not yet registered as frequently used settings of the application, exception processing (to be described below with reference to FIG. 13) is performed (S1004).

Thereafter, the settings of the registered custom button are automatically registered as frequently used settings of the application (S1005, S1006). This is done unless there is a reason such as reaching the maximum number of combinations of frequently used settings that can be registered, as will be described below.

Figure 10:
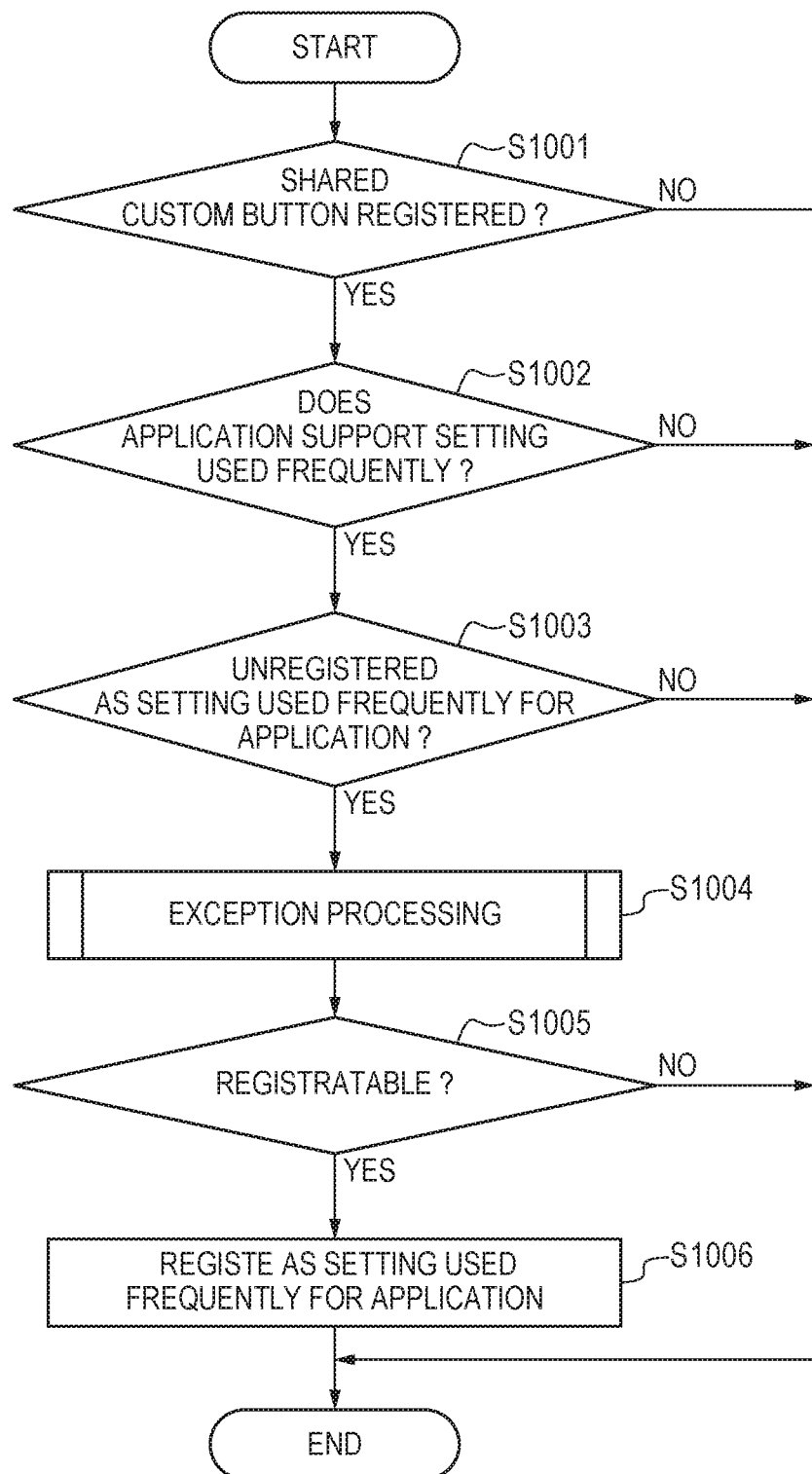
FIG. 10 is a flowchart of the process from registering a custom button to automatically registering frequently used settings in an application.
Figure 11:
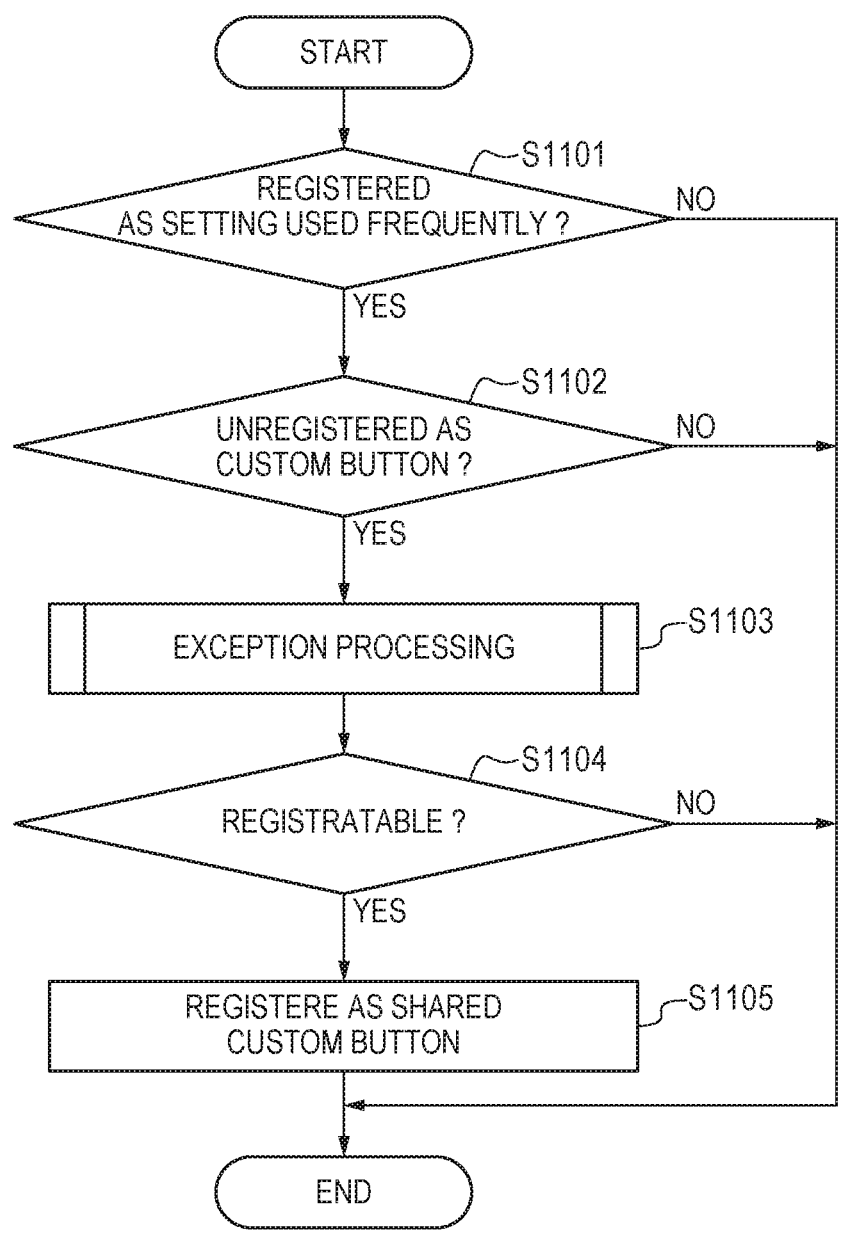
FIG. 11 is a flowchart of the process from registering frequently used settings in an application to automatically registering a custom button.

Now, FIG. 11 describes the flow from registering frequently used settings to registering a custom button, as opposed to FIG. 10.

The CPU 100 first detects that frequently used settings of an application are registered (S1101).

Upon detecting that the frequently used settings of the application are registered, the CPU 100 determines whether the registered frequently used settings are already registered as a custom button (S1102).

If the registered frequently used settings are already registered as a custom button, no further registration is needed and therefore the process terminates.

If the registered frequently used settings are not yet registered as a custom button, exception processing (to be described below with reference to FIG. 13) is performed (S1103).

Thereafter, the registered frequently used settings of the application are automatically registered as a custom button (S1104, S1105). This is done unless there is a reason such as reaching the maximum number of custom buttons that can be registered, as will be described below.

Thus, as described with reference to FIGS. 10 and 11, if either one of a custom button and a combination of frequently used settings of an application is registered, the other one is also automatically registered.

The exception processing is performed at S1004 and S1103 because there may be differences between data managed for the custom button and data managed for the frequently used settings of the application when the settings are automatically registered. In that case, for example, the CPU 100 displays a warning to the user.

Now, data tables managed for the settings will be described with reference to FIGS. 12A and 12B.

FIG. 12A illustrates information managed for custom buttons, and FIG. 12B illustrates information managed for frequently used settings of an application.

Button ID 1201 is a number for managing each combination of settings.

Application ID 1202 is a number for identifying each application. In the example of FIG. 12A, "101" indicates the copying application.

Shared/my 1203 is information indicating whether the custom button is a shared custom button or not. This item is included only in the custom button information in FIG. 12A.

Button name 1204 is the name of each combination of settings. A limited number of characters can be entered in this field. The number of characters that can be registered as the button name of a custom button may not be the same as the number of characters that can be registered as the button name of a combination of frequently used settings of an application.

If the number of characters entered by the user as the name of a custom button exceeds the maximum number of characters that can be registered, the exception processing to be described below (FIG. 13) displays a warning that the text cannot be entirely displayed on the custom button.

A comment on each combination of settings is registered in comment 1205. As with button name 1204, comment 1205 has the maximum number of characters that can be entered in the field.

Figure 13:
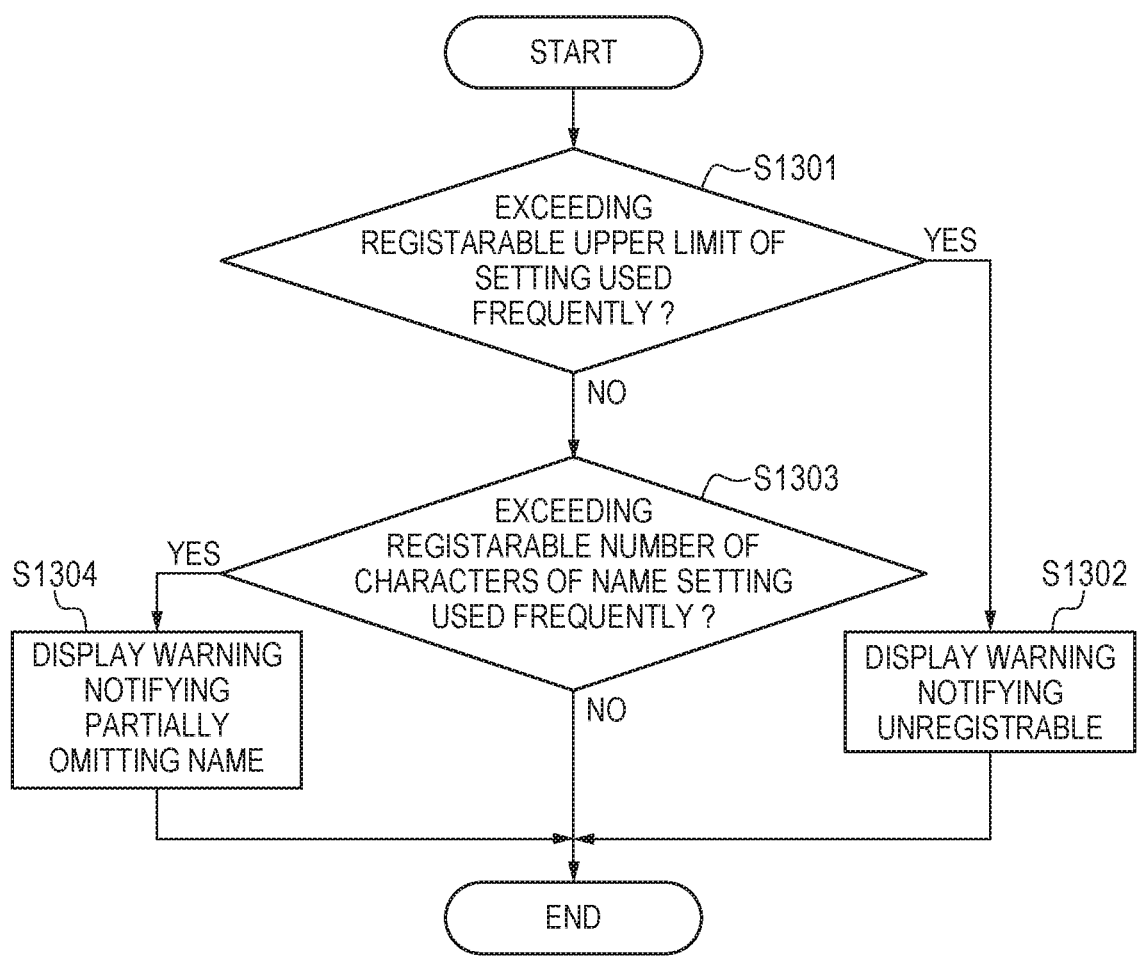
FIG. 13 is a flowchart of exception processing.

FIG. 13 is a flowchart illustrating the exception processing performed at S1004 in the flowchart of the process from registering a custom button to registering frequently used settings of an application (FIG. 10).

Once the custom button is registered, the CPU 100 first refers to the information about frequently used settings of the application as shown in FIG. 12B.

It is then determined whether the number of registered combinations of frequently used settings reaches the maximum number of combinations that can be registered (S1301).

If the maximum number of combinations of settings that can be registered is already reached, no more combinations of frequently used settings can be registered. A relevant warning is therefore displayed to the user (S1302).

If the maximum number of combinations of settings that can be registered is not reached, the CPU 100 determines whether the name of the custom button exceeds the maximum number of characters that can be registered as the name of a combination of frequently used settings (S1303).

If the maximum number of characters is exceeded, a warning is displayed to the user that the name of the custom button cannot be entirely displayed on the screen and the latter part of the displayed name would be hidden (S1304).

Upon completion of the exception processing, the process proceeds to S1005 in the flowchart of FIG. 10.

Processing similar to the above processing illustrated in FIG. 13 is also performed in the exception processing at S1103 in the flowchart of the process from registering frequently used settings of an application to registering a custom button shown in FIG. 11.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The aspect of the embodiments is applicable to a system including multiple apparatuses or to a system embodied as a single apparatus.

The disclosure is not limited to the above-described embodiment. Various modifications based on the spirit of the disclosure are possible and not excluded from the scope of the disclosure. Thus, the disclosure encompasses all combinations of the above-described embodiment and its variations.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-070625, filed Apr. 2, 2018, which is hereby incorporated by reference herein in its entirety.

What is claimed is:

1. An apparatus comprising:
a memory;
at least one processor coupled to the memory to:
execute an application;
register history of settings of the applications in a time order in which the application is executed according to the setting;
display a screen containing the registered history of setting of the application;
receive user instruction to register, as a first setting, a setting of the application contained in the history;
register, as the first setting, the setting of the application contained in the history according to the user instruction;
display a main screen containing an object to invoke the setting of the application registered as the first setting;
register, as a second setting, the setting of the application registered as the first setting, without the user instruction; and
display a screen for setting the application containing an object capable of invoking the setting of the application registered as the second setting.

2. The apparatus according to claim 1, wherein a first selecting unit for selecting the first setting of the of the application and a second selecting unit for selecting the second setting of the application registered based on a per-login-user are displayed on the screen.

3. The apparatus according to claim 2,
wherein the first selecting unit, the second selecting unit, and a third selecting unit for selecting a third setting that is a default setting of the application are displayed on the screen.

4. The apparatus according to claim 1,
wherein, when a user executes a new job in the application, as a new first setting of the application shared among the users, a setting selected by the user in execution of the job is registered.

5. The apparatus according to claim 1,
wherein, when a user executes a new job in the application, as a new second setting of the application based on a per-login-user, a setting selected by the user in execution of the job is registered.

6. The apparatus according to claim 4,
wherein, when the setting selected in the execution of the job is registered as the first setting, the setting as the second setting of the application is automatically registers.

7. The apparatus according to claim 5,
wherein, when the setting selected in the execution of the job is registered as the second setting, the setting as the first setting of the application shared among the users is automatically registers.

8. The apparatus according to claim 6, wherein, if the first setting of the application registered to be shared among the users cannot be registered as a setting of the application based on a per-login-user, a relevant warning to the user is provided.

9. The apparatus according to claim 7, wherein, if the second setting registered for the application cannot be registered as the first setting of the application shared among the users, a relevant warning to the user is provided.

10. The apparatus according to claim 1, further comprising a management unit,
wherein the management unit managing first data comprising: information about settings registered to be shared among the users; and information about settings registered based on a per-login-user.

11. The apparatus according to claim 10,
wherein the management unit further manages second data comprising information about the registered settings based on a per-application.

12. A method comprising:
executing an application;
registering history of settings of the applications in a time order in which the application is executed according to the setting;
displaying a screen containing the registered history of setting of the application;
receiving user instruction to register, as a first setting, a setting of the application contained in the history;
registering, as the first setting, the setting of the application contained in the history according to the user instruction;
displaying a main screen containing an object to invoke the setting of the application registered as the first setting;
registering, as a second setting, the setting of the application registered as the first setting, without the user instruction; and
displaying a screen for setting the application containing an object capable of invoking the setting of the application registered as the second setting.

13. The method according to claim 12, wherein a first selecting for selecting a first setting of an application and a second selecting for selecting a second setting of the application registered based on a per-login-user are displayed on the screen.

14. The method according to claim 12, wherein, when a user executes a new job in the application, as a new first setting of the application shared among the users, a setting selected by the user in execution of the job is registered.

15. The method according to claim 12, wherein, when a user executes a new job in the application, as a new second setting of the application based on a per-login-user, a setting selected by the user in execution of the job is registered.

16. A non-transitory computer-readable recording medium storing a program for causing a computer to perform the method comprising:

executing an applications;

registering history of settings of the application in a time order in which the application is executed according to the setting;

displaying a screen containing the registered history of setting of the application;

receiving user instruction to register, as a first setting, a setting of the application contained in the history;

registering, as the first setting, the setting of the application contained in the history according to the user instruction;

displaying a main screen containing an object to invoke the setting of the application registered as the first setting;

registering, as a second setting, the setting of the application registered as the first setting, without the user instruction; and displaying a screen for setting the application containing an object capable of invoking the setting of the application registered as the second setting.

17. The recording medium according to claim 16, wherein a first selecting unit for selecting the first setting of the application and a second selecting unit for selecting a second setting of the application registered based on a per-login-user are displayed on the screen.

18. The recording medium according to claim 16, wherein, when a user executes a new job in the application, as a new first setting of the application shared among the users, a setting selected by the user in execution of the job is registered.

19. The recording medium according to claim 16, wherein, when a user executes a new job in the application, as a new second setting of the application based on a per-login-user, a setting selected by the user in execution of the job is registered.

* * * * *